E. A. POND.
SPHYGMOGRAPHS.

No. 183,205.

Patented Oct. 10, 1876.

Witnesses
Ewell A. Dick
D. P. Cowl

Inventor
Erasmus A. Pond
by attys Pollok & Bailey

JAMES R. OSGOOD & CO. BOSTON.

UNITED STATES PATENT OFFICE.

ERASMUS A. POND, OF RUTLAND, VERMONT.

IMPROVEMENT IN SPHYGMOGRAPHS.

Specification forming part of Letters Patent No. 183,205, dated October 10, 1876; application filed September 25, 1876.

*To all whom it may concern:*

Be it known that I, ERASMUS A. POND, of Rutland, Vermont, have invented certain new and useful Improvements in Sphygmographs, of which the following is a specification:

This invention relates principally to sphygmographs—that is, instruments for graphically delineating or recording the movements of the pulse or any pulsating body. Some of the features of the invention, however, are applicable to sphygmoscopes as well.

My present invention is in many respects an improvement on those inventions comprised in Letters Patent No. 161,821, dated April 6, 1875, and No. 167,785, dated September 14, 1875. It embodies many of the features shown in said patented apparatus. It, however, possesses other features not found in the same, some of which are applicable not only to sphygmoscopes operating on the principle set forth in said patents, but also to the old form of sphygmograph.

The nature of my invention, and the manner in which the same is or may be carried into effect, will be understood by reference to the accompanying drawing.

Figure 1:
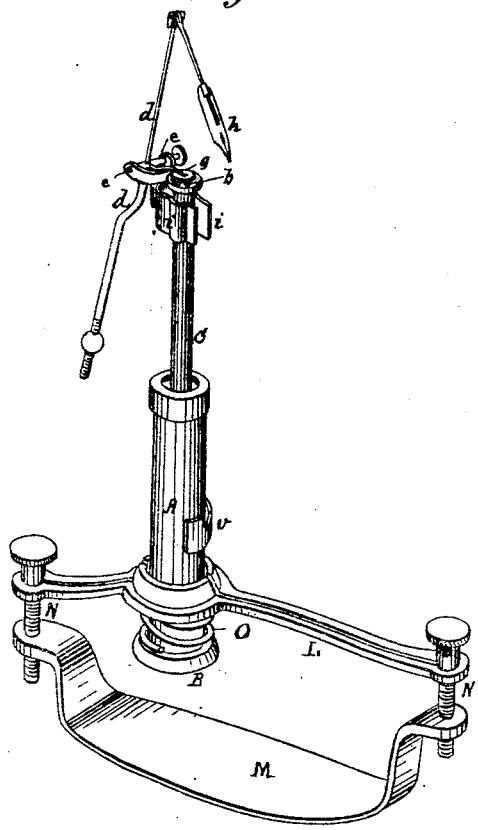
Figure 2:
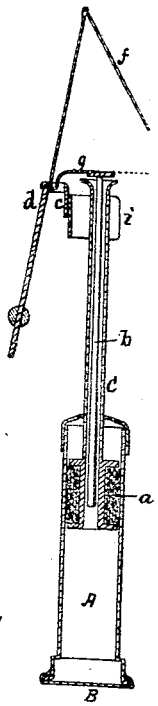
Figure 3:
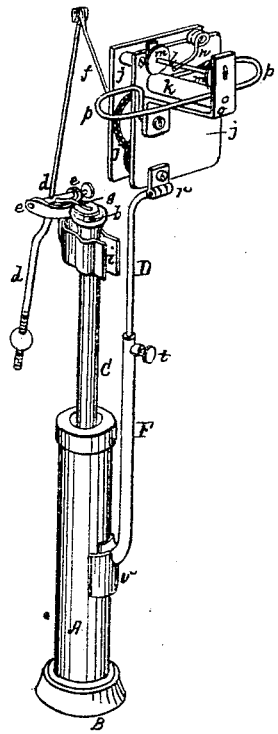
Figure 4:
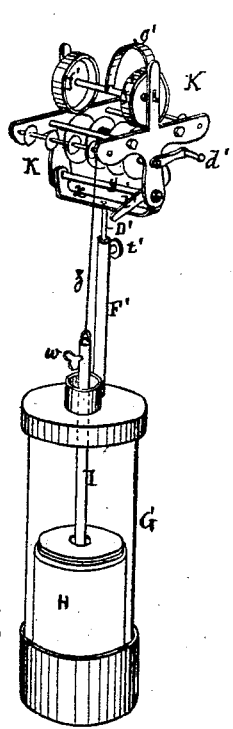
Figure 5:
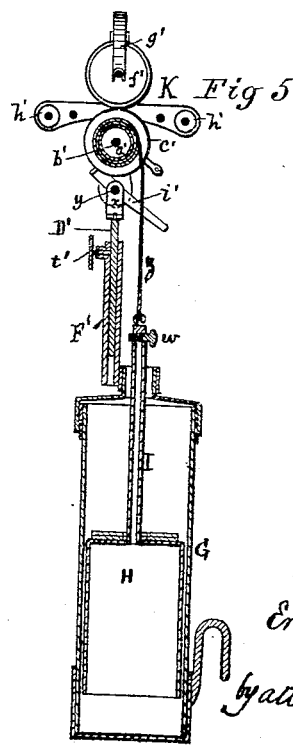

Figure 1 is a perspective view of the instrument without the apparatus for feeding along the paper or other material to be marked. With the instrument is also represented the holder which confines the instrument in its proper place, and with the proper pressure on the wrist. Fig. 2 is a vertical central section of the instrument shown in Fig. 1. Fig. 3 is a perspective view of the instrument, provided with the device for holding and feeding the paper or other material to be marked. Figs. 4 and 5 are, respectively, a perspective view and a vertical central section of a modified form of the holding and feeding apparatus.

A is the liquid receptacle or cylinder, and B the membrane closing that end which is applied to the pulsating part. C is a terminal tube, provided with a piston, $a$, and adapted to move up and down in the cylinder A. These parts operate together, as described in the Letters Patent above recited. In the tube C is placed a float, $b$, whose position in the tube is determined by the height of the column of liquid therein. This float may be made of any light material. I prefer that it should consist of a delicate glass tube, with sealed ends, the air having first been expelled therefrom. Glass I find to be preferable, because it is non-corrodable, cheap, and easily made into a float. This float rises and falls with the column of liquid in the tube, and this movement of the float I utilize to actuate the tracing-instrument, which serves to record the pulse movement. One way of doing this is shown in the drawing. The recording-instrument is what I term a pendulous-pointed needle.

To a suitable frame, $c$, is connected a vibratory lever, $d$, hung on delicate pivots $e$. To the upper end of this lever, by an equally delicate joint, is hung the needle $f$, which, in this instance, is the tracing-instrument. From the lever projects an arm, $g$, which extends over and is intended to have contact with, or be connected with, the float $b$. In this case the arm $g$ has contact with the float. The lever $d$ is of such length as to magnify the movement at its marking end, or the end to which the tracer is jointed, sufficiently to give the proper delineation on the material to be marked, and the lever, as shown, is so balanced that its arm $g$ will continually apply itself, with a very light pressure to the float.

The pendulous-jointed needle is intended to rest by its point on the surface to be marked. This jointed needle is a great improvement over what has heretofore been employed for a like purpose. It gives a correct trace, and avoids all external jar. It never misses its trace, as it rests by its point alone, all the time and under all conditions, on the paper or other tracing-surface. It matters not to which end of the lever the jointed tracer is connected, whether the upper end, as shown, or the lower end. In the latter case the upper end will become the counterbalancing-arm, and the needle attached to the lower end will hang at any desired angle, so as to adapt it to rest by its point, under all conditions, on the tracing-surface.

I would here remark that the jointed tracer can be applied to and used with the levers of the old form of sphygmograph, and that it may also be used in my instrument with any suitable system of lever, other than represented, for communicating the movement of the float to the tracer.

The tracing-instrument I have specifically named is a needle, an instrument adapted to operate on a smoked surface formed on paper varnished or albumenized, glass, mica, metal, &c. But the tracing-instrument may as well be a pen, for instance, as indicated in Fig. 1, where the pen $h$ is provided on its back with an eye or socket through which the needle is inserted. In this case the paper or any other suitable material on which the pen will leave a distinguishable mark or trace can be used.

The tracing device may be connected with the sphygmoscope proper in any desirable way. I connect it with the tube C, so that it may move with the tube when the latter is adjusted; and I prefer to make this connection by means of a spring-clasp, $i$, which permits the tracing device to be removed from or applied to the tube at will. With the tracing or marking device, and the apparatus for actuating that device by the pulse movement, I combine a mechanism for holding and feeding the material to be traced. In Fig. 3 this mechanism is shown with a spring or watch movement, $j$, as the motive-power. The feed-roller $k$ is driven by this power, and above said roller is a shaft, $l$, with wheels $m$ thereon, which are pressed down upon the roller by a spring, $n$, with yielding pressure, the shaft having its journals in slots or vertically-movable bearings in the frame $o$.

The platform or support for the paper, mica, or other material passing between the feed-roller and upper wheels is marked $p$. This holding and feeding apparatus is supported by a rod, D, to which it is preferably connected by a horizontal hinge-joint, $r$, as seen in Fig. 3. The rod itself fits and is adjustable in a socket in the stem F, in which it is held in the desired position by a set-screw, $t$. The rod can rotate as well as move up and down in the stem. By this mode of connection the holding and feeding mechanism can be adjusted in any desired direction, and set at any desired angle with reference to the needle or other tracing-instrument.

The lower end of stem F fits in a socket, $v$, formed for it on the cylinder A, and can be removed from or applied to the cylinder at will.

A modified form and feeding mechanism is shown in Figs. 4 and 5. With this apparatus the feed of the material to be marked or traced can be regulated as desired.

Within a cylinder, G, is snugly fitted a hollow piston, H, of proper weight, open at the bottom and closed at the top, except where it is connected with its rod I. This rod is tubular, and its upper end is provided with a cock or valve, $w$, by which it can be closed or opened at will. To the top of the cylinder is attached a tubular stem, F′, which supports a cylindrical rod or spindle, D′, that fits and is adjustable therein, being held in place by a set-screw, $t'$. To the top of the spindle D′ is fixed a yoke, $x$, on which is hung, by a shaft and tie-rod, $y$, the holding and feeding mechanism K. The mechanism K has therefore all the adjustments of the mechanism shown in Fig. 3.

The rod I is provided at its upper end with a cord, $z$, which is attached to and winds upon the drum $a'$. This drum is fixed on the shaft $b'$, which carries the feed-wheels $c'$. To one of the ends of the shaft $b'$ is fixed a crank, $d'$. Above the feed-wheels are pressure-wheels $f'$, mounted on a shaft that has vertical play in its bearings, and is pressed downward by a spring, $g'$. Mounted in the main frame of the apparatus, parallel and in line with and on each side of the feed-shaft, are auxiliary shafts carrying wheels $h'$, which serve to uphold the material that is passing between the feed-wheels and pressure-wheels.

The crank $d'$ is used to elevate the piston by means of the cord $z$. Let us suppose the piston raised to its highest position in the cylinder, and the cock $w$ closed. In this position there should be water enough in the cylinder to seal the lower end of the piston, thus confining within the piston a body of air that cannot escape through cock $w$. Therefore, by opening the cock $w$ more or less, the piston will descend with correspondingly greater or less speed, and will consequently impart to the feed-wheels a movement of rotation, the rapidity of which will depend entirely upon the rate of movement of the piston. Thus the feed of the paper or other material to be traced or marked can be governed readily by means of the stop-cock $w$.

A brake, $i'$, may be used to arrest the movement at any desired point.

In Fig. 1 is shown a holder, by which the instrument may be accurately placed and held on the arm over the pulse with any desired degree of pressure. L and M are the two parts of the holder connected by screw N, which pass loosely through L and screw into holes in M. The part L is provided with an aperture for the passage of the barrel part of the liquid-cylinder A, as shown, and is provided on its under side with a spiral spring, $o$, which takes against the flange on the lower end of the cylinder. The holder is placed around the wrist, with the membrane B of cylinder A over the pulse. Then, by screwing down one or both of the screws N, the instrument is pressed over and upon the pulse. By means of the spring $o$ different degrees of pressure can be readily obtained.

I would now remark that the three-armed lever $d\ g$ can be readily used to show the force of the pulse in grains or by weight. This I do by lengthening the arm $g$, and converting that arm into a weighing-beam by forming on it a scale, and providing it with a sliding weight. By this means it can be readily ascertained how much the pulse will lift.

Having now described my invention, I shall state my claims as follows:

1. In apparatus for recording the movement of pulsating bodies, a needle, or other marking or tracing instrument, connected by a free joint with the device by which it is supported, and through the intermediary of which the movement of the pulsating body is communicated to it, substantially as set forth.

2. The pendulous needle, or other tracing-instrument, and its supporting vibratory lever, in combination with the pulsatory float, substantially as set forth.

3. The combination, substantially as set forth, of a cylinder-piston and float, a marking or tracing mechanism operated by said float, and a feeding and holding mechanism adjustable to properly present the surface to be marked to the action of the tracing-instrument.

4. The vibratory three-armed lever, provided with jointed needle or other tracing-instrument, having one of its arms arranged to be operated by the pulsating float, and adapted to be used as a weighing-beam, substantially as set forth.

5. A sphygmograph, in which the tracing mechanism is operated by a float, which derives its movement from the pulsatory movement of the liquid in the liquid-cylinder or receptacle of the instrument, substantially as set forth.

6. In combination with the feed-wheels of the feeder and holding mechanism, the cylinder, hollow piston, piston-rod, and stop-cock or valve thereon, said rod being connected with the feed mechanism by a cord, and the parts being arranged to operate as described and shown in Figs. 4 and 5 of the accompanying drawing.

In testimony whereof I have hereunto signed my name this 26th day of August, A. D. 1876.

ERASMUS A. POND.

Witnesses:
  H. M. BAILEY,
  W. C. BROWN.